(12) United States Patent
Wang

(10) Patent No.: US 7,231,588 B2
(45) Date of Patent: Jun. 12, 2007

(54) VIDEO DISPLAY APPARATUSES AND DISPLAY METHODS THEREOF

(75) Inventor: Rex Wang, Taipei (TW)

(73) Assignee: Via Technologies Inc., Taipei (TW)

( * ) Notice: Subject to any disclaimer, the term of this patent is extended or adjusted under 35 U.S.C. 154(b) by 0 days.

(21) Appl. No.: 11/121,782

(22) Filed: May 4, 2005

(65) Prior Publication Data

US 2006/0098030 A1  May 11, 2006

(30) Foreign Application Priority Data

Aug. 11, 2004  (TW)  ............................... 93124026 A

(51) Int. Cl.
  *G06F 9/00*  (2006.01)
(52) U.S. Cl. ........................ 715/47; 345/214; 345/698; 715/768; 725/37
(58) Field of Classification Search ...................... None
  See application file for complete search history.

(56) References Cited

U.S. PATENT DOCUMENTS

| | | | |
|---|---|---|---|
| 6,353,450 B1 * | 3/2002 | DeLeeuw | ................... 715/768 |
| 6,384,840 B1 | 5/2002 | Frank et al. | |
| 2002/0122136 A1 * | 9/2002 | Safadi et al. | ............... 348/465 |
| 2003/0076340 A1 * | 4/2003 | Hatori et al. | ............... 345/699 |
| 2004/0117819 A1 * | 6/2004 | Yu | ............................... 725/32 |

FOREIGN PATENT DOCUMENTS

WO   WO0124518   5/2001

OTHER PUBLICATIONS

China Office Action mailed Jan. 19, 2007.

* cited by examiner

*Primary Examiner*—Mark Zimmerman
*Assistant Examiner*—David Chu
(74) *Attorney, Agent, or Firm*—Thomas, Kayden, Horstemeyer & Risley

(57) ABSTRACT

Video display apparatuses and display methods thereof. The apparatus includes a first buffer, a second buffer, a third buffer, a blending engine and a display engine. The first buffer stores a video source. The second buffer stores on screen display (OSD) source data. The third buffer stores a parameter for a transparent effect, and position information corresponding to at least one partition, in which the parameter determines the transparency of the video source in the partition. The blending engine performs the transparent effect on the video source and the OSD source data according to the parameter and the position information, thus generating blended source data. The display engine fetches and displays the blended source data from the blending engine on a display device.

12 Claims, 4 Drawing Sheets

VIDEO DISPLAY APPARATUSES AND DISPLAY METHODS THEREOF

BACKGROUND

The present disclosure relates generally to video displays, and, more particularly, to video display apparatuses and display methods thereof.

Digitized video data can be easily edited, and conveniently stored. In recent years, the popularization of processor-based devices has made common use of applications for digitized data feasible. In addition to conventional computer provided functions, most current computer systems have integrated additional function for the purpose of entertainment, such as VCD/DVD players, and others.

Computer systems typically play video content in a media player. Video played in full screen may offer the optimal visual effect. A computer system, however, may have several applications running simultaneously. For example, an email system and a messenger can be executed while video is playing. If the video is played in full screen mode, other applications and the computer desktop will be obscured thereby. FIG. 1 shows a computer desktop 100, including 5 icons A, B, C, D, and E. When the video 200 is played in full screen, the computer desktop 100 is covered with the video 200, as shown in FIG. 2.

Typically, when an email message or instant message is received, a window 300 is popped up over the top of the video 200 to notify users, as shown in FIG. 3. This pop-up behavior is unexpected and interrupts the video, and requiring user interaction as it blocks the video.

SUMMARY

Video display apparatuses and display methods thereof are provided. An exemplary embodiment of a video display apparatus, comprises a first buffer, a second buffer, a third buffer, a blending engine, and a display engine. The first buffer stores a video source. The second buffer stores on screen display (OSD) source data. The third buffer stores a parameter for generating a transparent effect, and position information corresponding to at least one partition, wherein the parameter determines the transparency of the video source in the partition. The blending engine performs the transparent effect on the video source and the OSD source data according to the parameter and the position information, thus generating blended source data. The display engine fetches and displays the blended source data from the blending engine on a display device.

In some embodiments of a video display method, a video source, OSD source data, a parameter for a transparent effect, and position information corresponding to at least one partition are received. The parameter determines the transparency of the video source in the partition. The transparent effect is performed on the video source and the OSD source data according to the parameter and the position information, thus generating blended source data. The blended source data is then displayed.

The above-mentioned embodiments of display methods may take the form of program code embodied in a tangible media. When the program code is loaded into and executed by a machine, the machine can become an apparatus for practicing the disclosed methods.

DESCRIPTION OF THE DRAWINGS

Video display apparatuses and display methods thereof will become more fully understood by referring to the following detailed description with reference to the accompanying drawings, wherein.

DESCRIPTION

Video display apparatuses and display methods thereof are provided.

Figure 1:
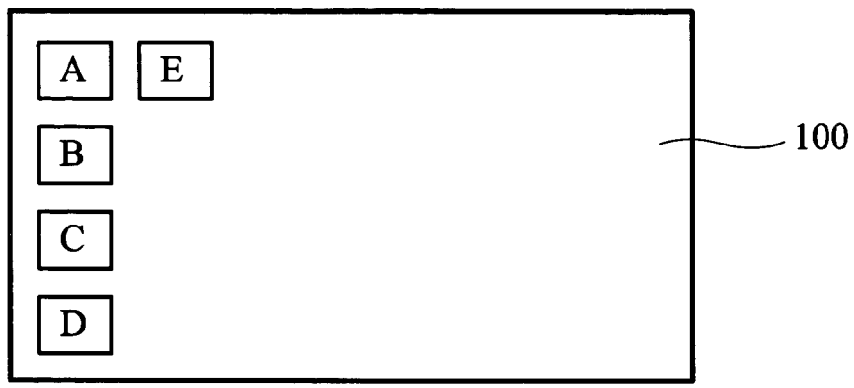
FIG. 1 shows a computer desktop.
Figure 2:
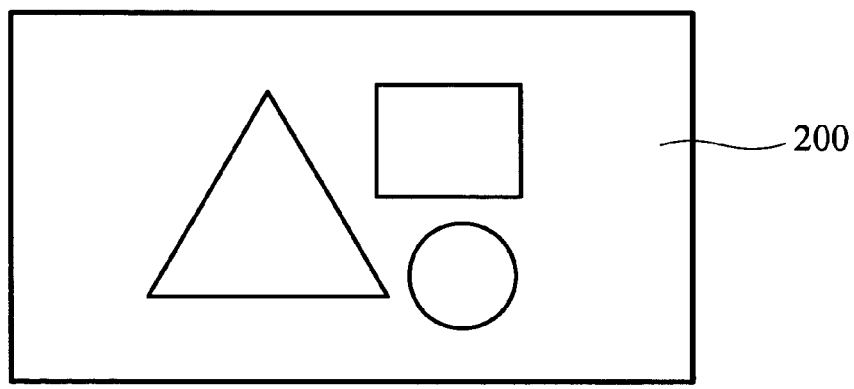
FIG. 2 shows a video played in full screen.
Figure 3:
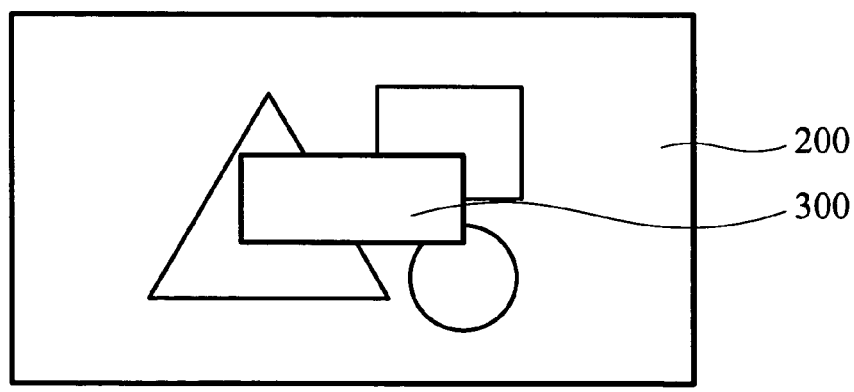
FIG. 3 shows a window displayed on top of the video.
Figure 4:
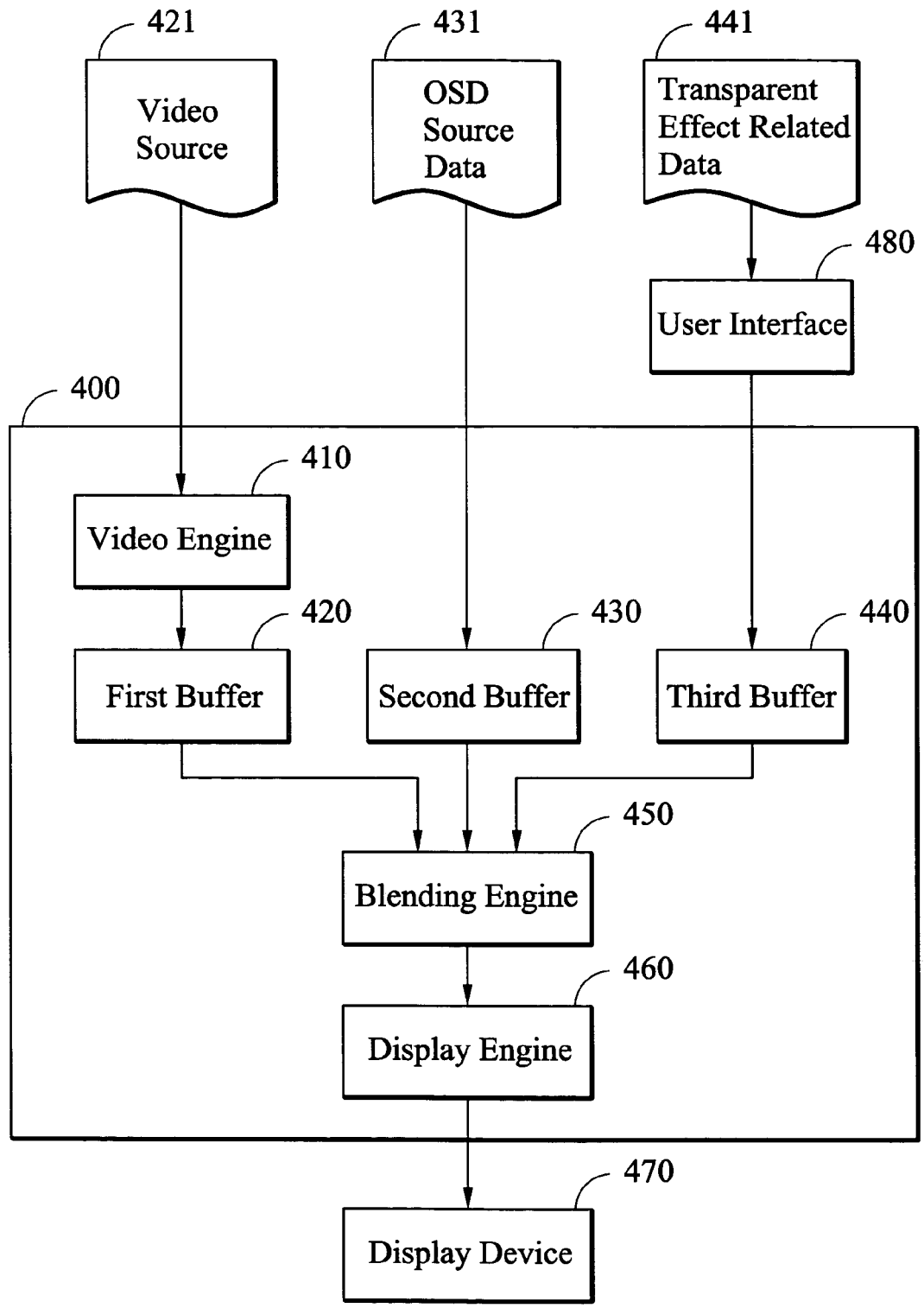
FIG. 4 is a schematic diagram illustrating the architecture of an embodiment of a video display apparatus with transparent effect.

FIG. 4 is a schematic diagram illustrating the architecture of an embodiment of a video display apparatus with transparent effect.

The video display apparatus 400 comprises a video engine 410, a first buffer 420, a second buffer 430, a third buffer 440, a blending engine 450, and a display engine 460.

The video engine 410 reads a video source 421, and decodes the video source 421 into a version recognized by a computer system. The video engine 410 plays the video source 421. The video source 421 may be a media file, such as data recorded in a VCD or DVD. The first buffer 420 stores the decoded video source 421 from the video engine 410.

The second buffer 430 stores on screen display (OSD) source data 431. It is understood that the OSD source data 431 may be controlled and provided by an operating system or applications of a computer system.

The third buffer 440 stores related data 441 for generating a transparent effect, or "alpha blending". The data 441 for generating a transparent effect comprises a parameter for a transparent effect, and position information corresponding to at least one partition. The parameter determines the level of transparency of the video source 421 in the partition. The position information can be used to determine the location and range of the partition in the video source 421. It is understood that the data 441 can be predefined by the video display apparatus 400, or received via a user interface 480. Users can define the location and transparency range of a partition in the video source 421, and the corresponding level of transparency degree during playback of the video source 421. Additionally, the third buffer 440 can be implemented in an effects engine (not shown) generating the transparent effect, and performing related transformation and data transmission in response to directions from the effects engine.

The video display apparatus 400 provides two types of transparent effects, single block and multi-block transparent effects. The type of transparent effect to be performed can be selected via the user interface 480. In the single block transparent effect, a single transparency parameter is applied to the entire video source 421. The transparent effect does not require the position information of the partition. In the multi-block transparent effect, the video source 421 is divided into several partitions, each requiring a respective transparency parameter. The respective transparency parameters can be set arbitrarily to obtain different visual results.

The blending engine 450 performs a transparent effect on the data, corresponding to the partition, of the video source 421 in the first buffer 420 and the OSD source data 431 in the second buffer 430 according to the transparent effect data 441 effect, thus generating blended source data (not shown).

An embodiment of a transparent effect uses the following equation:

$$[r,g,b]_{BSD} = \alpha [r,g,b]_{VS} + (1-\alpha)[r,g,b]_{OSDS},$$

where $[r,g,b]_{VS}$ is the video source 421, $[r,g,b]_{OSDS}$ is the OSD source data 431, $\alpha$ is the transparency parameter, $[r,g,b]_{BSD}$ is the blended source data. It is understood that the equation is not limited thereto. The coefficients for the video source 421 and OSD source data 431 can be adjusted according to specific requirements.

The blending engine 450 further transforms the data 441 for the transparent effect, such that the transformed data conforms to the format of the video source and the OSD source data. Transformation of data 441 can be accomplished by the effects engine.

The display engine 460 fetches the blended source data from the blending engine 450, and transmits and displays it to a display device 470, such as a computer monitor.

Figure 5:
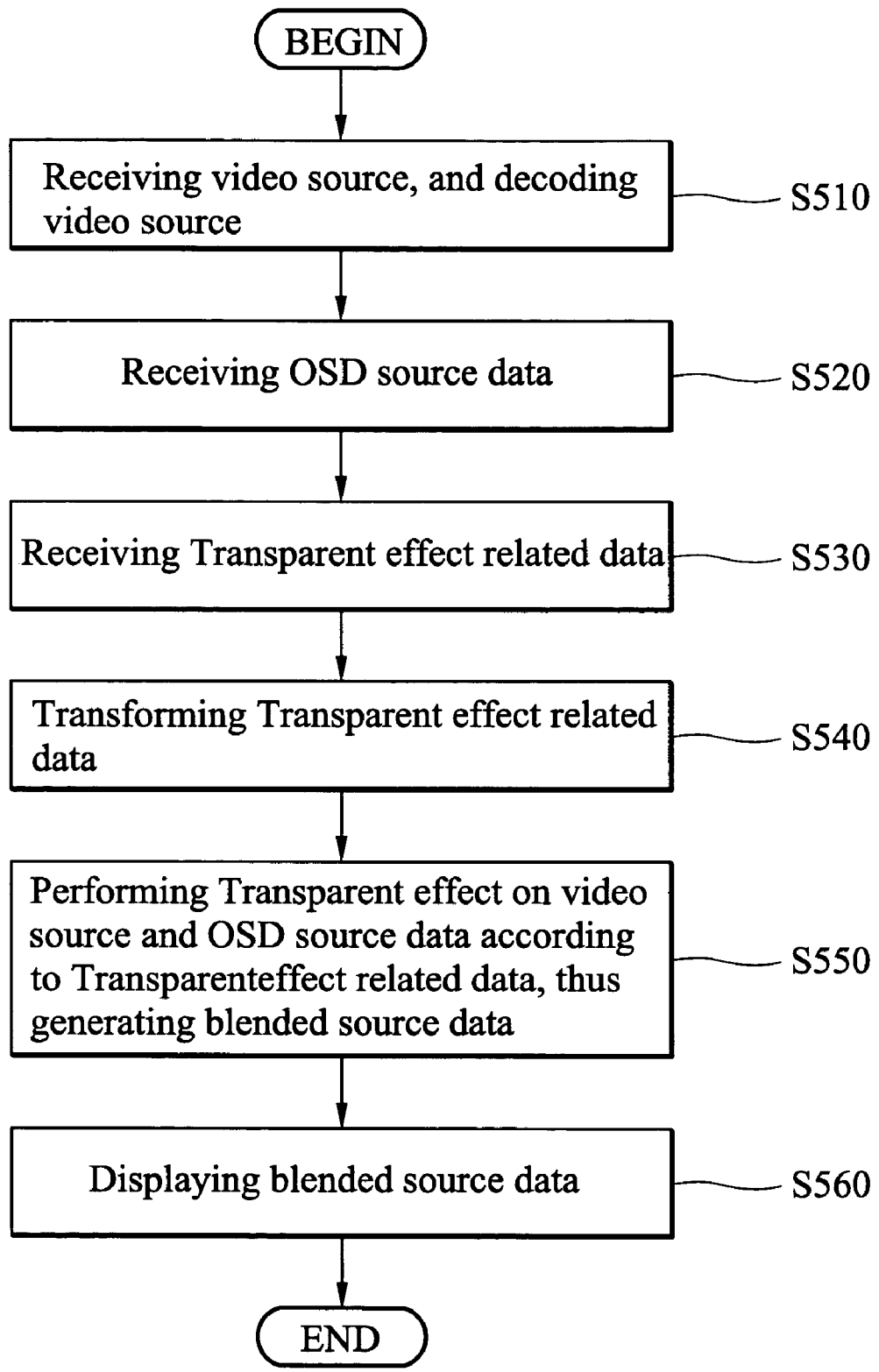
FIG. 5 is a flowchart showing an embodiment of a video display method with transparent effect.

FIG. 5 is a flowchart showing an embodiment of a video display method with transparent effect.

First, in step S510, a video source is received and decoded. In step S520, OSD source data is received. The OSD source data may be controlled and provided by an operating system or applications of a computer system. In step S530, related data for the transparent effect is received. The data for transparent effect may comprise a parameter for a transparent effect, and/or position information corresponding to at least one partition. The parameter determines the level of transparency of the video source in the partition. It is understood that the data for a single block transparent effect comprises a transparency parameter and no position information of the partition. The data for a multi-block transparent effect comprises transparency parameters and position information for respective partitions.

In step S540, the data for the transparent effect is transformed, such that the transformed data conforms to the format of the video source and the OSD source data. Then, in step S550, a transparent effect is performed on the video source and the OSD source data according to the parameter and the position information, thus generating blended source data. In step S560, the blended source data is displayed on a display device.

In some embodiments of a video display method, the transparency parameter for the upper region of the video source can be set to 1 (the transparent effect is not performed on the upper region of the video source), and the transparency parameter for the lower region of the video source can be set to a smaller value, such that the lower region of the video source becomes transparent. Therefore, the status of respective applications on the computer desktop can be monitored in the transparent region. Thus application information can be monitored during video playback.

Figure 6:
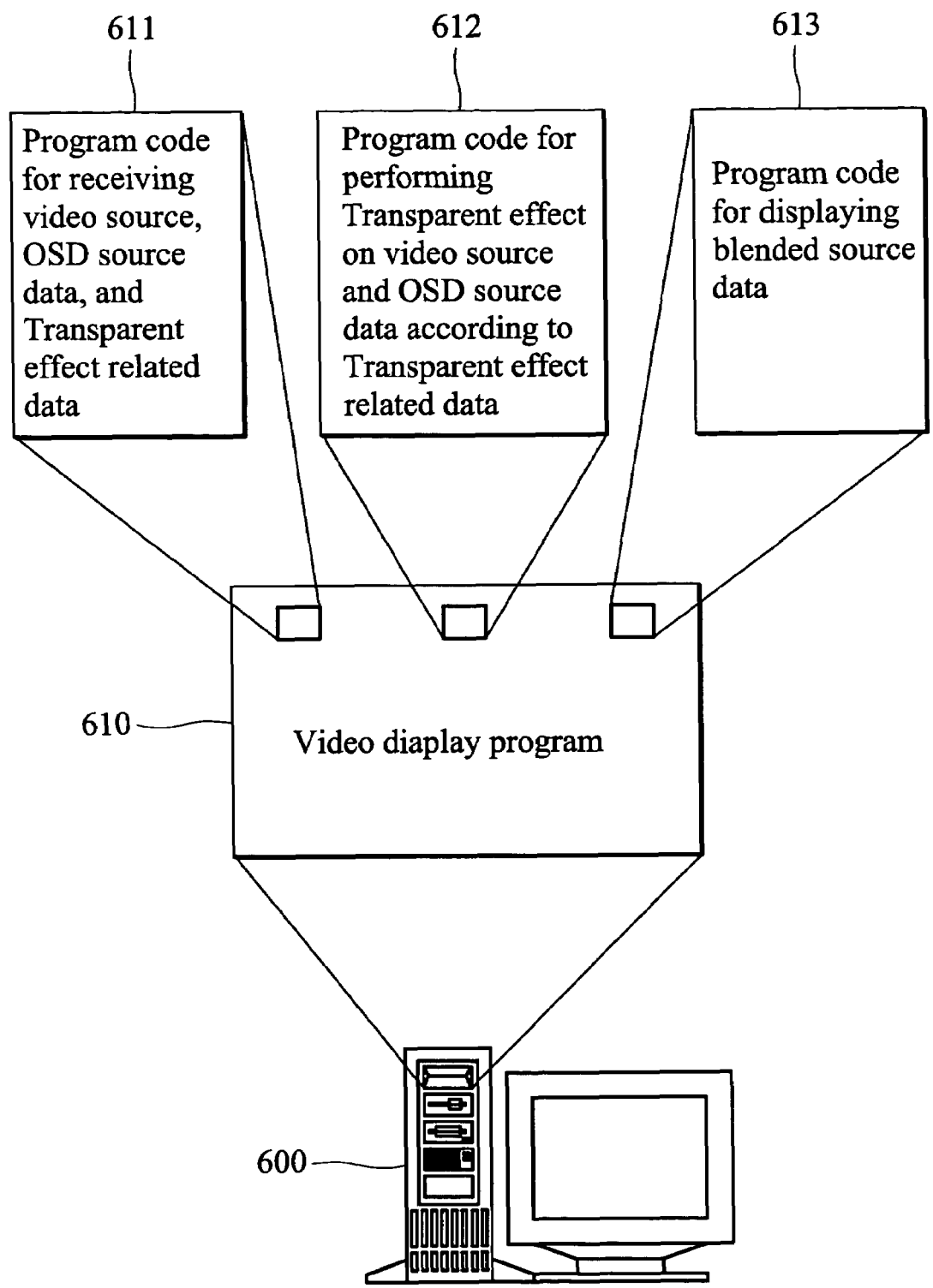
FIG. 6 is a schematic diagram illustrating a storage medium storing a computer program for execution of an embodiment of a video display method with transparent effect.

FIG. 6 is a schematic diagram illustrating a storage medium storing a computer program providing an embodiment of a video display method with transparent effect. The computer program product comprises a storage medium 610 having computer readable program code embodied therein for use in a computer system 600. The computer readable program code comprises at least computer readable program code 611 receiving a video source, OSD source data, a parameter for a transparent effect, and position information corresponding to at least one partition, computer readable program code 612 performing the transparent effect on the video source and the OSD source data according to the parameter and the position information, thus generating blended source data, and computer readable program code 613 displaying the blended source data.

Video display apparatuses and display methods thereof, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiments, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A video display apparatus, comprising:
   a first buffer storing a video source;
   a second buffer storing on screen display (OSD) source data;
   a third buffer storing a parameter for a transparent effect, and position information corresponding to a partition, in which the parameter determines the transparency of the video source in the partition;
   a blending engine to perform the transparent effect on the video source and the OSD source data according to the parameter and the position information, thus generating blended source data, wherein the blending engine further transforms the parameter and the position information, such that the parameter and the position information conform to the format of the video source and the OSD source data; and
   a display engine to receive the blended source data from the blending engine, and display the blended source data.

2. The apparatus of claim 1 wherein the display engine further transmits the blended source data to a display device, thereby displaying the blended source on the display device.

3. The apparatus of claim 1 further comprising a video engine to decode and play the video source.

4. The apparatus of claim 1 further comprising a user interface to receive the parameter and the position information.

5. A video display apparatus, comprising:
   a first buffer storing a video source;
   a second buffer storing on screen display (OSD) source data;

a third buffer storing parameters for a transparent effect, and position information corresponding to a plurality of partitions, in which each parameter determines the transparency of the video source in the corresponding partition;

a blending engine to respectively perform the transparent effect on the data corresponding to respective partition of the video source and the OSD source data according to the corresponding parameter and position information, thus generating blended source data, wherein the blending engine further transforms the parameters and the position information, such that the parameters and the position information conform to the format of the video source and the OSD source data; and a display engine to receive the blended source data from the blending engine, and display the blended source data.

6. The apparatus of claim 5 wherein the display engine further transmits the blended source data to a display device, thereby displaying the blended source on the display device.

7. The apparatus of claim 5 further comprising a video engine to decode and play the video source.

8. The apparatus of claim 5 further comprising a user interface to receive the parameters and the position information.

9. A video display method, comprising:

receiving a video source;

receiving on screen display (OSD) source data;

receiving a parameter for a transparent effect, and position information corresponding to at least one partition, in which the parameter determines the transparency of the video source in the partition;

transforming the the parameter and the position information, such that the parameter and the position information conform to the format of the video source and the OSD source data;

performing the transparent effect on the video source and the OSD source data according to the parameter and the position information, thus generating blended source data; and displaying the blended source data.

10. The method of claim 9 further comprising transmitting the blended source data to a display device, thereby displaying the blended source on the display device.

11. The method of claim 9 further comprising decoding and playing the video source.

12. The method of claim 9 further comprising receiving the parameter and the position information via a user interface.

* * * * *